3,578,714
PROCESS FOR PREPARING ANILINE
FROM PHENOL
Joseph L. Russell, Ridgewood, N.J., assignor to
Halcon International, Inc.
No Drawing. Filed Oct. 28, 1968, Ser. No. 771,342
Int. Cl. C07c 85/06
U.S. Cl. 260—581                                      4 Claims

ABSTRACT OF THE DISCLOSURE

A process for preparing aniline by the direct amination of phenol with ammonia in the vapor phase in the presence of a solid, heterogeneous catalyst. It has been discovered that significant process improvements are obtained if the phenol feed to the reaction is vaporized in the absence of substantial amounts of ammonia.

BACKGROUND OF THE INVENTION

Aniline is an important chemical of commerce and is advantageously prepared from phenol by the direct vapor phase amination thereof with ammonia. This reaction requires a solid catalyst, preferably one of those disclosed and claimed in U.S. Pat. No. 3,272,865. Reaction conditions usually employed are those disclosed in the aforesaid patent and include temperatures between about 300° C. and about 600° C. Reaction pressures are superatmospheric and are preferably above 7 atmospheres (above about 100 p.s.i.a.). This process is an extremely advantageous one but, in large scale operations suffers from unanticipatable and, largely inexplicable, disadvantages, to the overcoming of which this invention relates.

The amination reaction takes place in the vapor phase and the feed to the amination reaction accordingly is in the form of a vapor. In the case of ammonia, this presents no problem because of ammonia's volatility. On the other hand, phenol is a material of low volatility and, therefore, requires high temperature for vaporization. Since compression of phenol vapor is an inherently uneconomic and undesirable operation, the vaporization of phenol, practically speaking, must occur at a pressure sufficiently above reaction pressure to permit the phenol vapor to be fed directly to the reactor and this requires even further increase in vaporization temperature. Of course, if eductors are used to increase phenol pressure, vaporization temperature and pressure can be marginally reduced, even to levels below that of the reaction but the reduction is too marginal to obviate high temperature vaporization.

To overcome this problem and to avoid the decomposition involved in such high temperature vaporizations, those skilled in the art introduce a substantial amount of ammonia, suitably the entirety of the ammonia needed for the amination, to the unit in which the phenol is vaporized in order to thereby reduce the phenol partial pressure and enable the volatilization of phenol to take place at a much lower temperature than would otherwise be the case. This will hereafter be referred to as "co-vaporization" even though the ammonia need not be fed to the phenol vaporizer as a liquid. When this co-vaporization is carried out on a large scale, however, inexplicable losses of phenol appear to occur. Indeed, phenol losses of as much as 15% of the phenol feedstock have been observed in such co-vaporizations. Furthermore, the aniline product from the reaction is dark in color, and accordingly requires extensive purification to permit a satisfactory, water-white color to be obtained in the ultimate product.

SUMMARY OF THE INVENTION

It has now been found that the yield loss and color body formation referred to above are readily overcome by the vaporization of the phenol in the absence of substantial amounts of ammonia and, preferably, in the total absence of ammonia. It is not clear why the presence of ammonia during phenol vaporization should cause these problems, since, under the conditions employed, no reaction between these two materials would be expected. It is clear, however, that some unexpected phenomena occur during such co-vaporizations. It is also clear that the interaction, whatever its nature may be, does not occur in the vapor phase since, when phenol vapor and ammonia vapor are admixed and are fed to the reaction zone wherein the amination occurs, no such undesirable phenomena are noted. It is preferred that the phenol vaporization occur in the total absence of ammonia but this invention is not so limited since, while even small amounts of ammonia (or the order of 10 mol percent or more in the vapor phase in contact with the vaporizing phenol), result in some yield loss or color body formation, the extent to which this occurs, is tolerable, even on a commercial scale. It should be borne in mind, however, that both the amount of yield loss and the extent of reactor effluent coloration are both directly related to the quantity of ammonia present during the phenol vaporization. Hence, the greater the amount of ammonia present, the poorer the results and the amount of ammonia allowed to be present during phenol vaporization therefore is dictated by economic considerations extraneous to this invention. Thus, "the absence of substantial amounts of ammonia" as used herein and in the appended claims is intended to mean that the amount of ammonia allowed to be present during phenol vaporization is reduced sufficiently below that required for the conduct of the amination reaction to achieve the desired yield and product color, these factors depending on desired process economics. This means that the amount of ammonia present during phenol vaporization is desirably well below the stoichiometric (one mole af ammonia per mole of phenol) present in the vapor phase in contact with the vaporizing phenol, preferably less than 0.1 mol of ammonia per mol of phenol (expressed on the same basis) and most preferably is zero.

When in accordance with the especially preferred practice of this invention, the phenol is vaporized in the total absence of ammonia, the vaporization conditions to be employed are clearly dictated by the physical properties of phenol taken in conjunction with the known conditions for conduct of the amination reaction. The same is true for ammonia vaporization. All that is normally required is that the pressure at which the vaporization of each of the reactants is carried out be slightly higher than the pressure at which the amination reaction is to be carried out. Known pressures for the conduct of the amination reaction are super-atmospheric, desirably above 100 p.s.i.a., preferably above about 150 p.s.i.a., and most preferably, between about 150 to 350 p.s.i.a. Accordingly, for a reaction pressure of, for instance, 240 p.s.i.a., the vaporization of each of the reactants should occur at a pressure of typically 245–250 p.s.i.a. (i.e., about 5–10 p.s.i. above the reactor pressure to allow for pressure drop through transfer piping, admixing and reactor inlet losses). Accordingly, in this preferred practice, the phenol vaporization takes place at a temperature of about 320° C. while the ammonia vaporization takes place at about 45° C.

The vaporization of phenol can, of course, be facilitated by the presence of an inert vapor during the vaporization. Suitable inerts for this purpose include such materials as helium, neon, argon, nitrogen, methane, ethane and the like. While the use of such inerts is contemplated within the scope of the appended claims, it should be recognized that the diluent effect of such inerts can result in reduced conversion (or higher temperatures and/or pressures to achieve the same conversion) and further that such materials would, for economic reasons, normally have to be recycled, thereby increasing process costs. Accordingly, such usage is not preferred.

The amination reaction itself can be carried out at temperatures within the range broadly from 300° C. to 600° C., desirably from about 300° C. to 500° C. and preferably between about 350° C. and 435° C. A broad range of pressure can be used, pressures broadly between 150–350 p.s.i.a. being preferred. The ratio of ammonia to phenol in the reaction feed can also be carried over a broad range. On a molar basis, the ratio of ammonia to phenol can vary between 0.5:1 and 40:1, desirably between 1:1 and 20:1 and preferably between 5:1 and 20:1. At lower ammonia to phenol ratios, for example, at ratios below about 7:1, by-products (predominantly di- and tri-phenylamines) are formed in increasing quantities. At ammonia to phenol ratios of 10:1 or higher, aniline is substantially the only product formed in significant quantity.

A wide variety of solid catalysts can be used in the amination reaction.

The use of those disclosed and claimed in U.S. Pat. 3,272,865 is preferred. These include silica-alumina, titania-alumina, zirconia-alumina, phosphoric acid and tungsten oxide. Particularly preferred catalysts are the natural or synthetic acidic silica-aluminas preferably of the zeolitic type including, as a preferred species, molecular sieves.

EXAMPLES

The following examples are presented to further illustrate this invention, but are not intended as limiting the scope thereof. Unless otherwise stated, all parts and percents in the following examples are expressed on a molar basis. Each example (including controls) is conducted in a continuous manner and, in each, the initial state of the phenol is as a liquid at 70° C. while the initial state of the ammonia is also as a liquid but at 40° C.

Example 1

A sufficient quantity of a silica-alumina catalyst, containing 9.9% alumina, is charged to a tubular reactor to form a catalyst bed having a volume of approximately 850 cc. Dry liquid ammonia at the rate of 10 mols per hour is vaporized at 110–120° C. and fed to the reactor. Dry liquid phenol, at the rate of 0.5 mol per hour is separately vaporized at a temperature of 330–340° C. The phenol, after vaporization, is mixed with the already-vaporized ammonia and the mixture is then passed over the catalyst bed. The reactor is operated in this manner for 46 hours during which time reactor pressure is maintained at 225 p.s.i.g. and reactor temperature is maintained at about 385° C. During this period, the reactor effluent is cooled to 60–65° C., thereby condensing substantially the entirety of the organic materials present in the effluent. Unreacted ammonia is substantially uncondensed and is readily removed by simple vapor-liquid separation. The liquid portion of the condensed effluent is clear and has a pale yellow color.

Analysis of the results obtained throughout the run indicates that phenol conversion (mols phenol reacted per mol of phenol fed) is in excess of 95% and that the selectivity (mols aniline formed per mol of phenol reacting) is 93%. More than 98% of the organic material fed to the system (feed vaporization plus reaction and recovery equipment) is accounted for in the products obtained.

Control A: Into the same reaction system charged with the same quantity of the same catalyst as used in Example 1, is fed a mixture of NH₃ and phenol obtained by co-vaporization of a dry feed containing, as in Example 1, 10 mols NH₃ per hour and 0.5 mol phenol per hour. Raoult's Law would indicate that vaporization would occur at a temperature of 177° C. while, actually, vaporization requires a temperature in excess of 200° C. indicating a negative deviation from ideality (activity coefficients of less than one). The reactor is operated at a pressure of 225 p.s.i.g. and a temperature of about 405° C. for a period of 28 hours. The effluent, recovered as in Example 1, is dark brown to black in color. Less than 85% of the phenol feed to the vaporizer can be accounted for in the reaction effluent. Phenol conversion is approximately 96% but selectivity to aniline is only 77% indicating by-product formation in the vaporizer.

Example 2

A reactor is charged with 850 cc. of a silica-alumina catalyst containing 12.4% alumina. Dry ammonia is vaporized at the rate of 2.5 mols per hour at a temperature of 110–120° C. and fed to the reactor. Dry liquid phenol at a rate of 0.5 mol per hour is vaporized at 330–340° C., pre-mixed with the ammonia vapor and the mixture is then fed to the reactor. The reduced ammonia to phenol ratio employed here (5:1, mol basis) in intended to increase diphenylamine production. The reactor is operated at a pressure of 225 p.s.i.g. and at a temperature of about 400° C. for a period of 48 hours. The effluent from the reactor is clear and has a pale yellow color. Over 99% of the organics fed to the vaporizers are accounted for in the reactor effluent. Phenol conversion is 91% and overall selectivity to aniline plus diphenylamine (mols aniline plus twice the mols of diphenylamine, the total being divided by the mols of phenol reacting and the quotient being expressed as a percentage) is 94%.

Control B: The procedure of Example 2 is repeated except that phenol and ammonia in the same molar ratio as is used in Example 2 are co-vaporized as in Control A. The co-vaporization requires a temperature in excess of 250° C. The reactor is operated at a pressure of 225 p.s.i.g. and at a temperature of 405° C. for 15 hours. The overall selectivity to aniline plus diphenylamine is only 81% and phenol conversion is only 59%. Only about 90% of the organics (i.e., phenol) present in the vaporizer feed are accounted for in the reactor effluent. The material not accounted for in the reaction effluent appears to represent by-products of unknown nature formed within the vaporizer and sufficient of these by-products are carried over into the reactor to adversely affect catalyst activity.

What is claimed is:

1. In the process for preparing aniline by the vapor phase amination of phenol with ammonia in the presence of a solid catalyst disposed within a reaction zone, the improvement which comprises the steps of vaporizing the phenol feed to the reaction zone in the presence of less than 10 mol percent of ammonia followed by the step of admixing the vaporized phenol with ammonia vapor thereby forming the feed to the reaction zone.

2. A process in accordance with claim 1 wherein the molar ratio of ammonia to phenol in the feed to the reaction zone is between about 0.5:1 and about 40:1.

3. In the process for preparing aniline by the vapor phase amination of phenol with ammonia in the presence of a solid catalyst disposed within a reaction zone, the improvement which comprises the steps of vaporizing the phenol feed to the reaction zone in the absence of ammonia followed by the step of admixing the vaporized phenol with ammonia vapor thereby forming the feed to the reaction zone.

4. A process in accordance with claim 3 wherein the molar ratio of ammonia to phenol in the feed to the reaction zone is between about 0.5:1 and about 40:1.

References Cited

UNITED STATES PATENTS 2,013,052    9/1935    Horsley _____ 260—581

CHARLES B. PARKER, Primary Examiner

R. L. RAYMOND, Assistant Examiner

U.S. Cl. X.R.

260—585